(12) United States Patent
Andersen et al.

(10) Patent No.: US 9,068,556 B2
(45) Date of Patent: Jun. 30, 2015

(54) PILOT CIRCUITRY FOR CONTROLLING THE EMERGENCY FEATHERING OF A WIND TURBINE

(75) Inventors: Jesper Lykkegaard Andersen, Hornslet (DK); Jens Bay Madsen, Arhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 796 days.

(21) Appl. No.: 13/302,457

(22) Filed: Nov. 22, 2011

(65) Prior Publication Data

US 2012/0134816 A1    May 31, 2012

Related U.S. Application Data

(60) Provisional application No. 61/417,337, filed on Nov. 26, 2010.

(30) Foreign Application Priority Data

Nov. 26, 2010   (DK) .................................. 2010 70512

(51) Int. Cl.
    F03D 7/02    (2006.01)

(52) U.S. Cl.
    CPC ............ F03D 7/0224 (2013.01); F03D 7/0264 (2013.01); *F05B 2260/76* (2013.01); *F05B 2270/1074* (2013.01); *F05B 2270/506* (2013.01); *F05B 2270/604* (2013.01); *Y02E 10/723* (2013.01)

(58) Field of Classification Search
    CPC . F03D 7/0224; F03D 7/0264; F05B 2260/76; F05B 2260/74; F05B 2260/75; F05B 2270/506; F05B 2270/1074; F05B 2270/604; F01D 7/00
    USPC ...... 416/147, 155, 156, 157 R, 157 A, 157 B, 416/158, 40, 41
    See application file for complete search history.

(56) References Cited

U.S. PATENT DOCUMENTS

| 4,348,155 | A | 9/1982 | Barnes et al. |
| 4,352,634 | A | 10/1982 | Andrews |

(Continued)

FOREIGN PATENT DOCUMENTS

| DE | 3009922 A1 | 9/1981 |
| DE | 199 48 997 | 4/2001 |

(Continued)

OTHER PUBLICATIONS

Sven Nytoft Rasmussen; 1st Technical Examination and Search Report issued in priority Denmark Application No. PA 2010 70512; Sep. 2, 2011; 4 pages; Denmark Patent and Trademark Office.

(Continued)

*Primary Examiner* — Edward Look
*Assistant Examiner* — Christopher J Hargitt
(74) *Attorney, Agent, or Firm* — Wood, Herron & Evans, LLP

(57) ABSTRACT

A pilot circuitry is disclosed for controlling the activation of an emergency feathering system of a wind turbine by means of a pilot pressure, wherein the pilot circuitry comprises at least two parallel control circuits for providing a pilot pressure. Additionally, a selector may be provided for selectively preventing a control circuit from providing the pilot pressure to the emergency feathering system in case of malfunction of the control circuit.

11 Claims, 7 Drawing Sheets

(56) References Cited

U.S. PATENT DOCUMENTS

| | | | |
|---|---|---|---|
| 6,067,782 | A | 5/2000 | Diekhans |
| 2007/0021792 | A1 | 1/2007 | Kieval et al. |
| 2007/0217912 | A1 | 9/2007 | Schmidt |
| 2008/0087014 | A1* | 4/2008 | Schick et al. ............ 60/403 |
| 2008/0219846 | A1 | 9/2008 | Annebique et al. |
| 2010/0014972 | A1* | 1/2010 | Steffensen ............ 416/31 |

FOREIGN PATENT DOCUMENTS

| | | | |
|---|---|---|---|
| DE | 19948997 A1 | 4/2001 | |
| DE | 20317749 U1 | 3/2005 | |
| EP | 1533520 A1 | 5/2005 | |
| EP | 1835174 A1 | 9/2007 | |
| EP | 1 967 739 | 9/2008 | |
| EP | 2 072 815 | 6/2009 | |
| EP | 2072815 A1 | 6/2009 | |

OTHER PUBLICATIONS

Ralph Lux; European Search Report issued in corresponding European Patent Application No. 11190482.7; Mar. 15, 2012; 8 pages; European Patent Office.

European Patent Office, Office Action issued in corresponding European Application No. 11190476.9, dated Jan. 12, 2015, 6 pages.

Ralph Lux; European Search Report issued in corresponding European Patent Application No. 11190476.9; Mar. 15, 2012; 6 pages; European Patent Office.

Flemming Qvist; 1st Technical Examination and Search Report issued in priority Denmark Application No. PA 2010 70508; Aug. 18, 2011; 5 pages; Denmark Patent and Trademark Office.

U.S. Patent and Trademark Office, Office Action issued in corresponding U.S. Appl. No. 13/303,848, dated Oct. 29, 2014, 17 pages.

European Patent Office, Office Action issued in corresponding European Application No. 11 190 482.7, dated Feb. 18, 2015, 5 pages.

* cited by examiner

PILOT CIRCUITRY FOR CONTROLLING THE EMERGENCY FEATHERING OF A WIND TURBINE

CROSS-REFERENCE TO RELATED APPLICATIONS

This application claims priority under 35 U.S.C. §119(a) to DK Application No. PA 2010 70512, filed Nov. 26, 2010. This application also claims the benefit of U.S. Provisional Application Ser. No. 61/417,337, filed Nov. 26, 2010. Each of these applications is incorporated by reference herein in its entirety.

TECHNICAL FIELD

The present invention relates to a pilot circuitry for controlling the activation of an emergency feathering system of a pitch controlled wind turbine.

BACKGROUND

Wind turbines having blade pitch systems for adjusting the pitch angle of the blades have been known for many years, typically employing electric pitch drives or hydraulic pitch drives. Early examples of hydraulic pitch drives are disclosed, for example, in U.S. Pat. No. 4,348,155 and U.S. Pat. No. 4,352,634, both of United Technologies.

Emergency feathering systems for wind turbines with variable pitch of the blades have been known for many years for turning the blades to the feathered position, i.e., where the blade is oriented with the chord parallel to the wind and the leading edge pointed in the direction of the wind, so that damages to the wind turbine are avoided during high wind.

It is one aspect of the present invention to provide an improved system for controlling the emergency feathering system so that malfunctions of parts of the control system to a lesser extent will prevent the wind turbine from operating and producing power, and thus improve the availability of the wind turbine.

SUMMARY

An embodiment of the present invention relates to a pilot circuitry for controlling the activation of an emergency feathering system of a wind turbine by means of a pilot pressure, wherein the pilot circuitry comprises at least two parallel control circuits for providing a pilot pressure. This provides for selectively connecting, for example, through a selector, the control circuits to the emergency feathering system, which allows for increased control of situations with malfunctions in the pilot circuitry itself. In one embodiment, a selector is provided for selectively preventing a control circuit from providing the pilot pressure to the emergency feathering system in case of malfunction of the control circuit. By at least duplicating the control circuit that provides the pilot pressure and introducing the selector, the pilot circuitry will obtain a much improved reliability.

The selector is in one embodiment adapted to perform a comparison of the pilot pressure of the at least two parallel control circuits and to disable a control circuit that provides a pilot pressure for activating the emergency feathering system while the remaining at least one control circuit provides a pilot pressure for not activating the emergency feathering system. When the control circuits are designed so that malfunction of an element of the control circuits will cause the control circuit in question to provide a pilot pressure for activating the emergency feathering system, this feature will ensure that a malfunctioning control circuit will be prevented from causing an undesired shutdown of the operation of the wind turbine.

In particular, the control circuits may in an exemplary embodiment comprise at least two valves and is designed so that a malfunction of one valve of the control circuit will cause the control circuit to provide a pilot pressure for activating the emergency feathering system.

In one embodiment, the pilot pressure for activating the emergency feathering system is lower than the pilot pressure for not activating the emergency feathering system. Hereby, a malfunction of the pilot circuitry or, for example, a leak in the pilot pressure line or another component receiving the pilot pressure will cause the blades to feather and the wind turbine to shut down, i.e., fail-to-safe.

The selector may comprise a selector valve equipped with at least one hydraulic actuator driven by the pilot pressures provided by the control circuits. Alternatively, the selector valve may be equipped with solenoid actuators where the control of voltage to the solenoids is based on measurements of the pilot pressure provided by the control circuits.

In an aspect of the invention, the selector is one or more shuttle valves.

Using a shuttle valve for selectively preventing the control circuits from providing pilot pressure to the emergency feathering system is advantageous in that a shuttle valve is both simple, inexpensive and reliable.

In general, a shuttle valve is a type of valve which allows fluid to flow through it from one of two sources typically by means of a ball or other blocking valve element that moves freely within the valve. A shuttle valve typically comprises two input ports and a output port and when pressure from a fluid is exerted through one of the input ports it pushes the ball towards the opposite input port, and thus blocking it. This prevents the fluid from travelling through that input port, but allows it to flow out through the output port arranged in the middle. In this way, two different control circuits can selectively provide a pilot pressure to the emergency feathering system without the threat of backflow from one control circuit to the other.

In an aspect of the invention, the selector is two or more shuttle valves and wherein the shuttle valves are coupled in parallel.

Coupling two or more shuttle valves in parallel is advantageous in that it provides the pilot circuitry with redundancy regarding the selector, thereby making the system more efficient and reliable.

Another aspect of the invention provides a pilot circuitry for controlling the activation of an emergency feathering system of a wind turbine by means of a pilot pressure, wherein the pilot circuitry comprises at least one control circuit comprising at least two valves and is arranged so that the control circuit can provide a pilot pressure for activating the emergency feathering system even in the case of a malfunction in one of the valves. In one embodiment, both valves have two positions so that four valve position combinations are provided for, and three of the four valve position combinations provide for a pilot pressure for activating the emergency feathering system, and one of the four valve position combinations provides for a pilot pressure for not activating the emergency feathering system. This means that the valve position combination that provides for a pilot pressure for not activating the emergency feathering system can be used in normal operation, and for emergency shut feathering one of the valve position combinations providing for a pilot pressure for activating the emergency feathering system can be used.

The remaining two combinations can then be for cases where one of the valves is malfunctioning.

An aspect of the present invention also relates to a wind turbine having a rotor with at least two blades and a blade pitch system for controlling the pitch angle of the blades, the blade pitch system comprising at least one hydraulic actuator and an emergency feathering system for in case of an emergency stop to turn the blades to a feathering position by means of the at least one hydraulic actuator, wherein the blade pitch system further comprising a pilot circuitry according to the invention as described herein.

The wind turbine comprises in an advantageous embodiment for each blade a hydraulic blade pitch drive with at least one hydraulic actuator and an emergency feathering system comprising a hydraulic accumulator adapted to provide a pressurized hydraulic liquid for driving the at least one hydraulic actuator to pitch the blade to an emergency feathering position.

BRIEF DESCRIPTION OF THE DRAWINGS

Embodiments of the present invention are discussed in the following with reference to the enclosed drawings, of which

DETAILED DESCRIPTION

Figure 1:
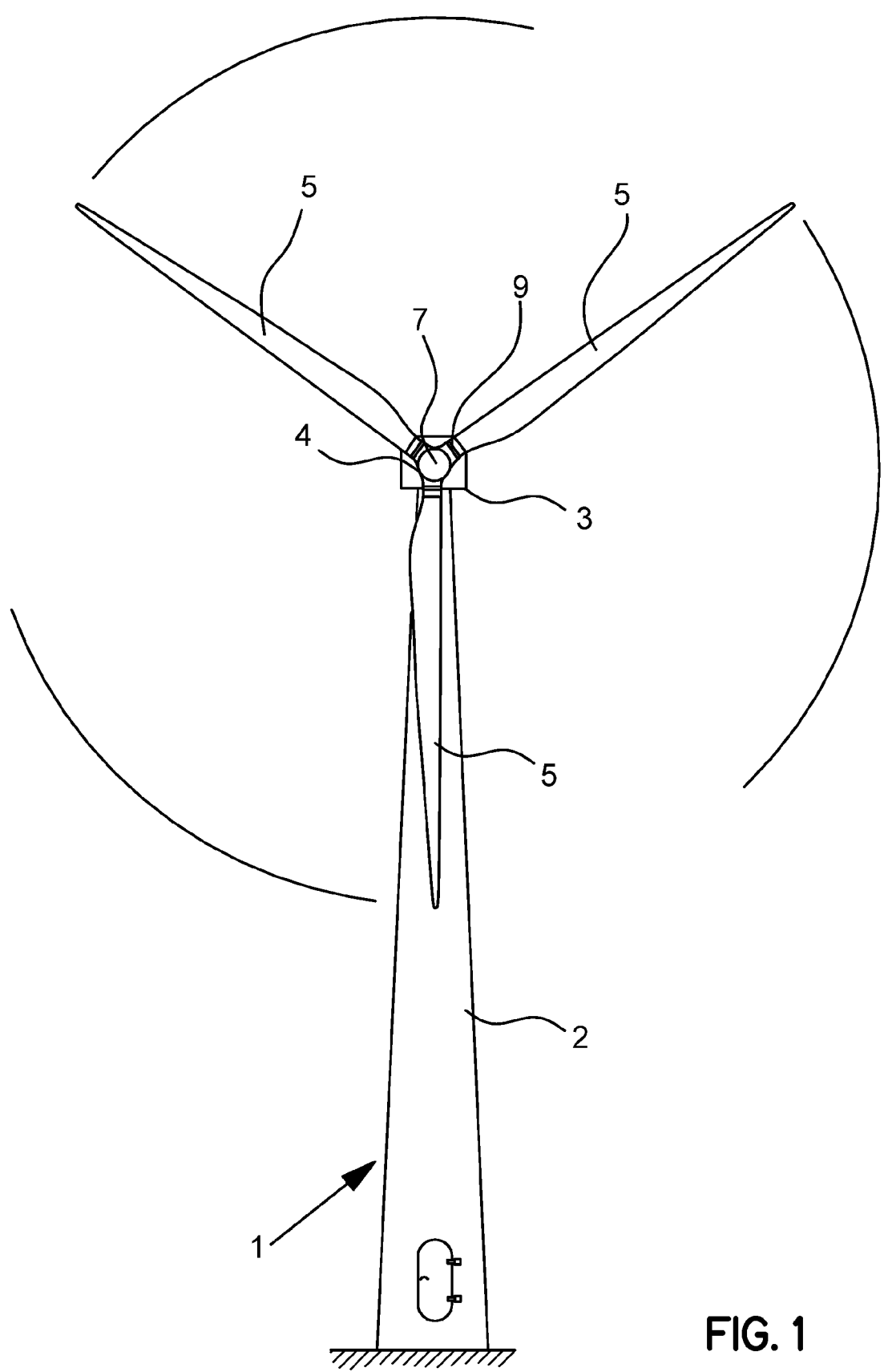
FIG. 1 illustrates a large modern wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
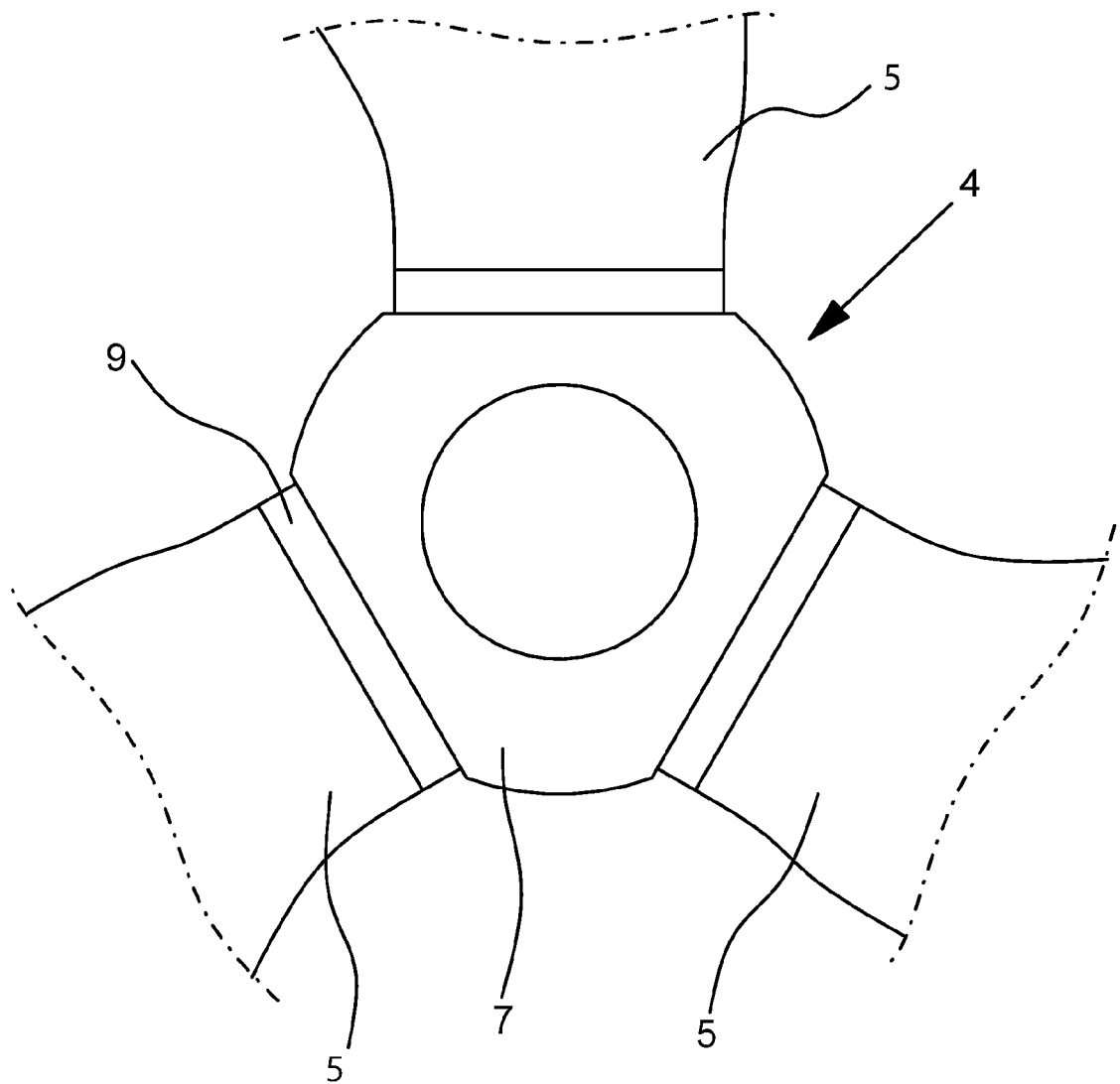
FIG. 2 illustrates a wind turbine hub comprising three blades as seen from the front.

FIG. 2 illustrates a wind turbine rotor 4 comprising a hub 7 and three blades 5 as seen from the front.

As illustrated, the pitch bearings 9 are arranged between the blades 5 and the hub 7 to enable that the blades 5 can be rotated around their longitudinal axis and to transfer forces mainly from three different sources. The blades 5 (and the bearings 9 themselves of course) are under constant influence of the force of gravitation. The direction of the gravitational force varies depending on the blade's 5 position, inducing different loads on the pitch bearings 9. When the blade is in motion the bearing 9 is also under influence of a centrifugal force, which mainly produces an axial pull in the bearing 9. Finally, the bearings 9 are under influence of the wind load on the blades 5. This force is by far the greatest load on the bearings 9 and it produces a massive moment, which the bearings 9 have to stand.

The load on and from all the pitch bearings 9 has to be transferred to the hub 7 and further into the rest of the wind turbine 1, and the pitch bearing 9 at the same time has to enable that the blade 5 can be pitched.

In this embodiment, the rotor 4 comprises three blades 5 but in another embodiment the rotor 4 could comprise one, two, four or more blades 5.

In this embodiment, the wind turbine 1 is a pitch regulated wind turbine 1, but in another embodiment the wind turbine could just as well be an active stall regulated wind turbine 1 since both pitch regulated wind turbines 1 and active stall regulated wind turbines 1 comprise a hydraulic blade pitch system 6 for pitching the blades 5.

Figure 3:
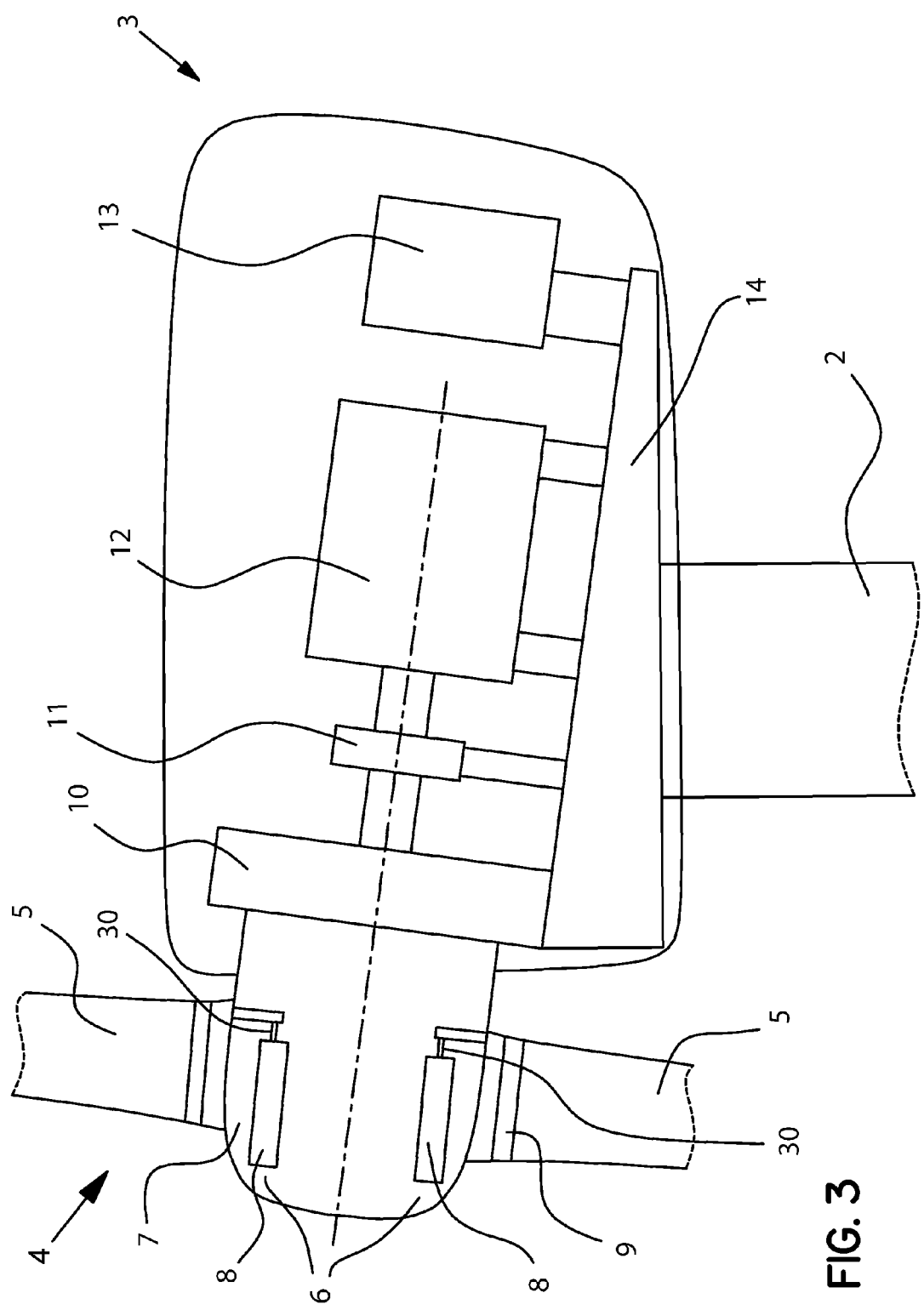
FIG. 3 illustrates a simplified cross section of a wind turbine nacelle as seen from the side.

FIG. 3 illustrates a simplified cross section of a nacelle 3 of a prior art wind turbine 1, as seen from the side. Nacelles 3 exist in a multitude of variations and configurations, but in most cases the drive train in the nacelle 3 almost always comprises one or more of the following components: a gearbox 10, a coupling (not shown), some sort of braking system 11 and a generator 12. A nacelle 3 of a modern wind turbine 1 can also include a frequency converter 13 and additional peripheral equipment, such as further power handling equipment, control cabinets, hydraulic systems, cooling systems and more.

The weight of the entire nacelle 3 including the nacelle components 10, 11, 12, 13 is carried by a nacelle structure 14. The components 10, 11, 12, 13 are usually placed on and/or connected to this common load carrying nacelle structure 14. In this simplified embodiment, the load carrying nacelle structure 14 only extends along the bottom of the nacelle 3, for example, in the form of a bed frame to which some or all the components 10, 11, 12, 13 are connected. In another embodiment, the load carrying structure 14 could comprise a gear bell, which through a main bearing (not shown) could transfer the load of the rotor 4 to the tower 2. Alternatively, the load carrying structure 14 could comprise several interconnected parts such as latticework.

In this embodiment, the hydraulic blade pitch system 6 comprises for each blade 5 a hydraulic blade pitch drive 8 having a rotating device or means for rotating the blades 5 in the form of hydraulic linear actuators 15 each connected to the hub 7 and one of the blades 5, respectively.

Figure 4:
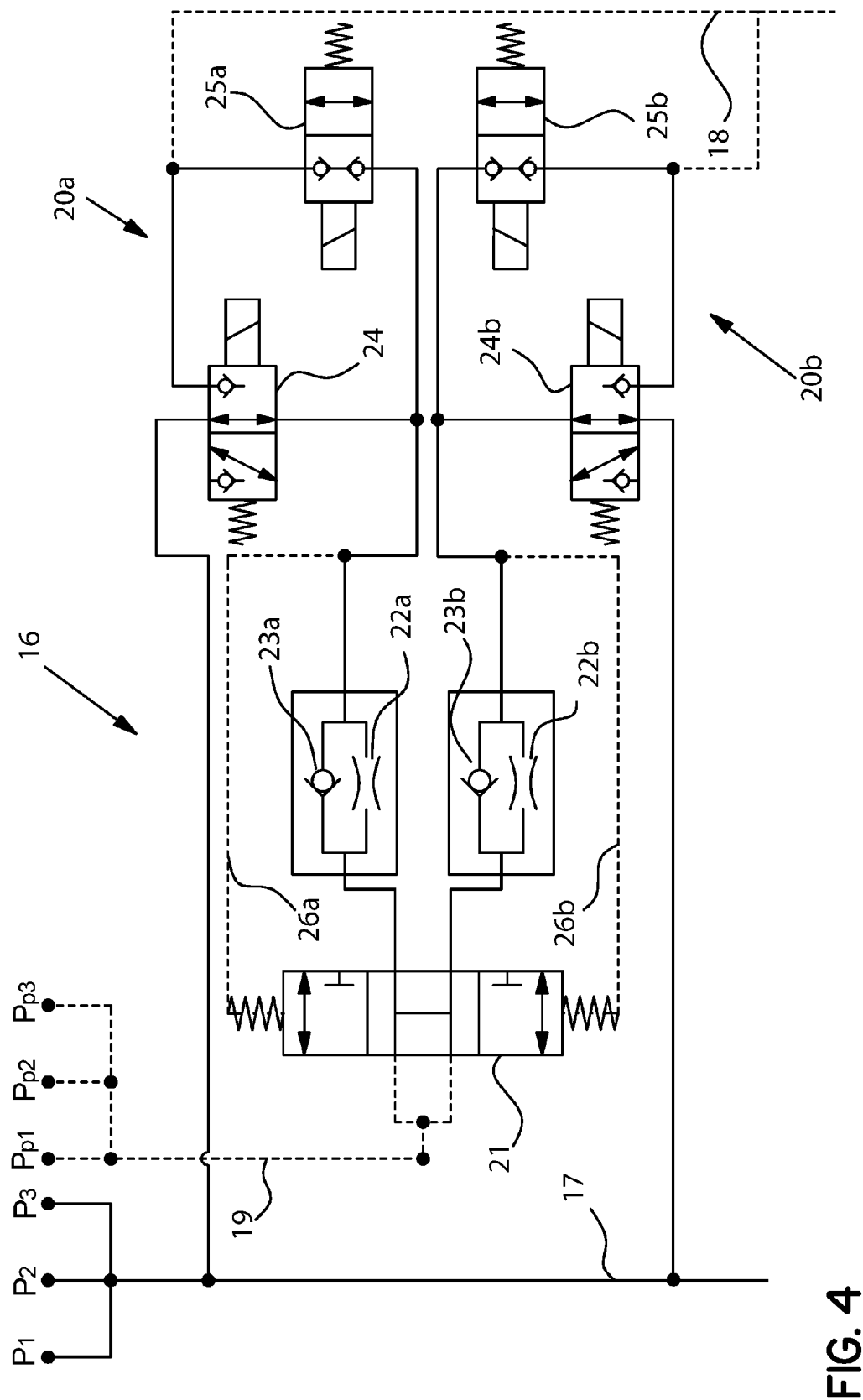
FIG. 4 is a diagram of an embodiment of a pilot circuitry according to the invention in a normal operation state.
Figure 5:
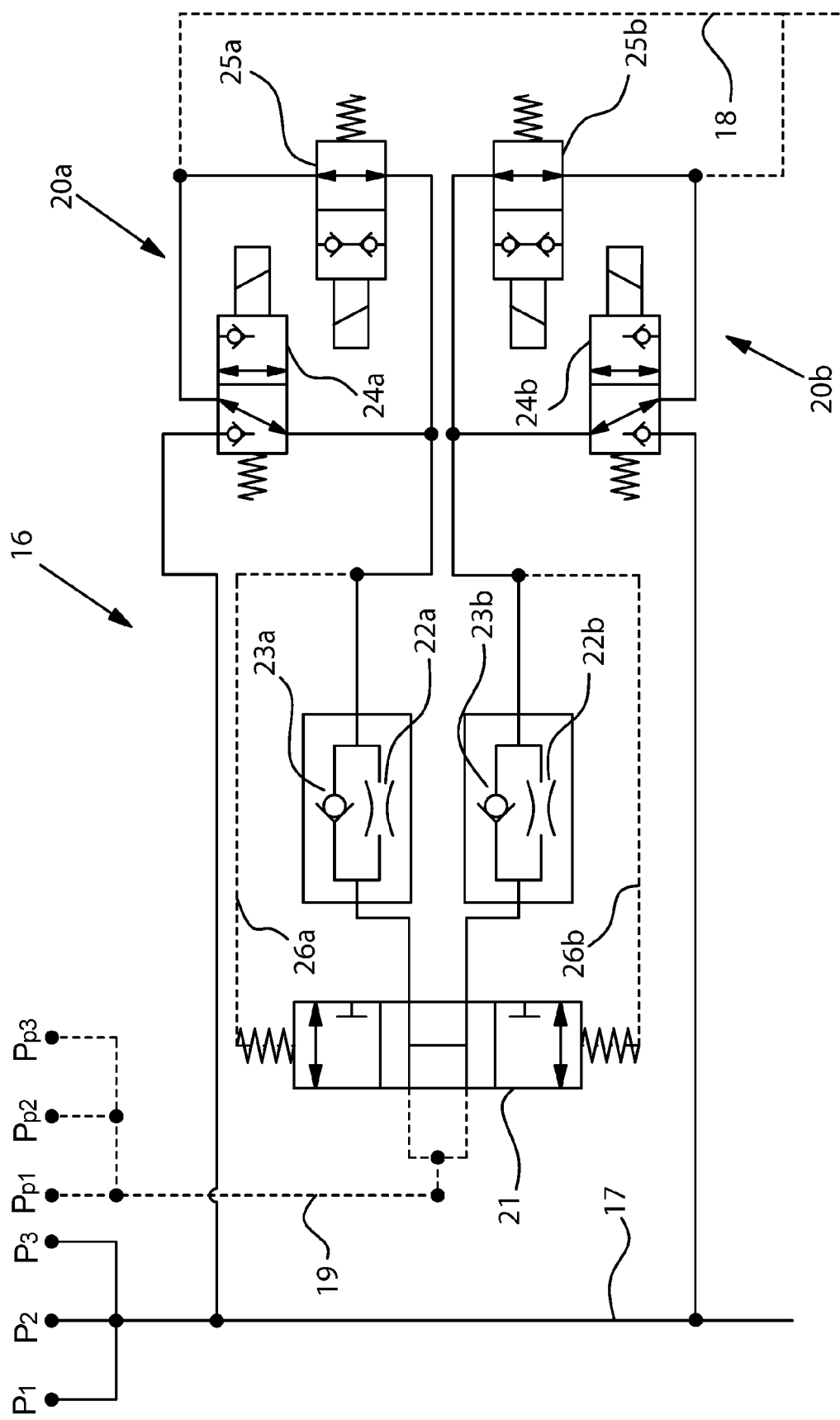
FIG. 5 is a diagram of the pilot circuitry according to FIG. 4 in an emergency feathering state.
Figure 6:
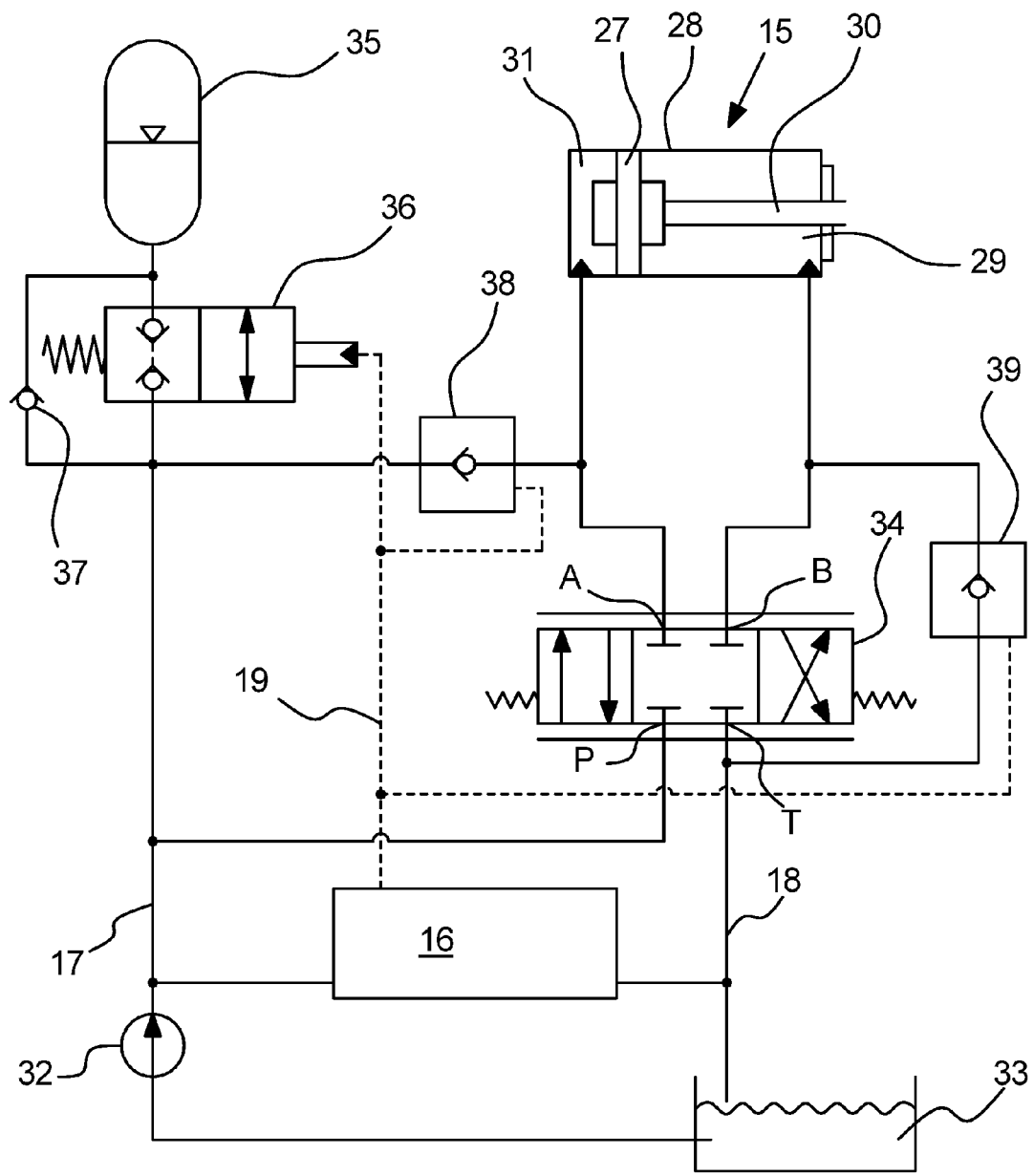
FIG. 6 is a diagram of a part of the hydraulic pitch system of a wind turbine including the embodiment of FIGS. 4 and 5.

The pilot circuitry 16 shown in FIGS. 4 and 5 is connected to a pressure line 17 for delivery of pressurized hydraulic liquid to the circuitry 16, a tank line 18 for discharge of hydraulic liquid at a low pressure, typically substantially at atmospheric pressure, and a pilot pressure line 19 by means of which a pilot pressure is provided from the pilot circuitry 16 to the emergency feathering system for the blades 5 as shown in FIG. 6.

The pilot circuitry 16 comprises a first control circuit 20a, a second control circuit 20b, a 4/3-way selector valve 21 for selecting one or both of the control circuits 20a, 20b to provide the pilot pressure, and two flow control arrangements each comprising an orifice 22a, 22b and a check valve 23a, 23b. Each of the control circuits 20a, 20b, comprises two valves, a 3/2-way valve 24a, 24b and a 2/2-way valve 25a, 25b. A control pressure from each of the control circuits 20a, 20b are fed to hydraulic actuators of the selector valve 21 via control pressure lines 26a, 26b.

In this embodiment, the selector 21 is a 4/3-way directional control valve, but in another embodiment, the directional control valve could comprise a different number of ports such as three, five or more, and the valve could comprise a different number of finite positions such as two, four or more, or the selector 21 could be of a different valve type such as an arrangement of on-off valves, a shuttle valve or other.

In ordinary operation, the solenoid actuators of each of the valves 24a, 24b, 25a, 25b of the two control circuits 20a, 20b are energized as shown in FIG. 4. The hydraulic pressure from the pressure line 17 passes through the 3/2-way valve 24a, 24b but is blocked by the 2/2-way valve 25a, 25a from passing on to the tank line 18. The orifice 22a, 22b restricts the flow of pressurized liquid to the pilot pressure line 19. The selector valve 21 is positioned in its centre position as the identical control pressures from the two control circuits 20a, 20b balance each other out just as the biasing spring actuators of the selector valve 21. The pressurized liquid from the two control circuits 20a, 20b through the two orifices 22a, 22b are mixed in the selector valve 21 and are led to the pilot pressure line 19 where it controls the emergency feathering system as described below with reference to FIG. 6. The high pilot pressure in the pilot pressure line 19 is controlling a normal operation of the wind turbine, i.e., the emergency feathering system is only activated when the pilot pressure drops as shown in FIG. 5.

The diagram in FIG. 5 shows the situation where an emergency stop of the wind turbine is activated, such as due to a major malfunction in the wind turbine, a sudden disconnection of the wind turbine from the main grid or a sudden drop in main grid voltage. The valves 24a, 24b, 25a, 25b of the two control circuits 20a, 20b are de-energized and the spring actuators will bias the valves to the positions as shown. Thus, the pressure from the pressure line 17 will not pass the 3/2-way valves 24a, 24b and the 2/2-way valves 25a, 25b will open to the tank line 18. The pressure present in the pilot pressure line 19 will discharge through the selector valve 21 and the check valves 23a, 23b via the 2/2-way valves 25a, 25b to the tank line 18 and the pilot pressure will thus drop immediately and cause the emergency feathering system to be activated and drive the blades 5 towards the feathering position. The selector valve 21 will remain balanced as the control pressure on both hydraulic actuators will drop to tank pressure.

The pilot circuitry 16 is designed with a fail-to-safe principle in order to obtain that the circuitry 16 will lower the pilot pressure in case an emergency stop is activated and that a high pilot pressure may be obtained in the start-up situation even in case of a malfunction of one of the control circuit valves 24a, 24b, 25a, 25b. Also, the malfunction of one of the valves during ordinary operation of the wind turbine should not force the turbine to perform an emergency stop. Hereby, an improved availability of the wind turbine is obtained.

In case an emergency stop is activated during normal operation of the wind turbine, a malfunction of one of the 3/2-way valves 24a, 24b may occur so that the valve will remain in the energized position as shown in FIG. 4. The corresponding 2/2-way valve 25a, 25b will, when it is de-energized, direct the flow of pressurised liquid from the pressure line 17 and through the malfunctioning 3/2-way valve 24a, 24b to the tank line 18. Thus, the 2/2-way valves 25a, 25b operate to ensure that a malfunction of the 3/2-way valves 24a, 24b will not prevent the activation of an emergency stop from resulting in a feathering of the blades 5. Should one of the 2/2-way valves 25a, 25b malfunction and remain in the energized position as shown in FIG. 4, the corresponding 3/2-way valve 24a, 24b will, when it is de-energized, close the flow path from the pressure line 17 and open to the tank line 18, thus lowering the pressure in the control circuit 20a, 20b.

At the restart operation after a planned shutdown or an emergency shutdown of the wind turbine, malfunction may occur in one of the control circuit valves 24a, 24b, 25a, 25b. In case of a malfunction of one of the 3/2-way valves 24a, 24b, so that the valve will remain in the de-energized position as shown in FIG. 5, the pressurized liquid from the pressure line 17 will not be allowed to pass the failing valve 24a, 24b. As a consequence, the control pressure from that control circuit 20a, 20b which will be fed via the corresponding control pressure line 26a, 26b to the hydraulic actuators of the selector valve 21 will remain low, whereas the control pressure from the other control circuit 20a, 20b will become high as the valves 24a, 24b, 25a, 25b of that control circuit are energized. Thus, the hydraulic actuators of the selector valve 21 will, due to the different control pressures, shift position to one side, so that solely the pressurized liquid from the control circuit 20a, 20b in full function will be fed to the pilot pressure line 19 and the wind turbine 1 will be able to perform the restart operation. Likewise, in case one of the 2/2-way valves 25a, 25b should malfunction, that valve 25a, 25b will remain open to the tank line 18 and the pressure will not build up in that control circuit 20a, 20b with the corresponding result. Thus, the malfunction of one of the valves 24a, 24b, 25a, 25b of the control circuits 20a, 20b will not prevent the wind turbine from restarting.

In case one of the valves 24a, 24b, 25a, 25b of one of the control circuits 20a, 20b should malfunction during ordinary operation of the wind turbine 1, the control pressure in the control pressure line 26a, 26b of that control circuit 20a, 20b will drop and the action of the hydraulic actuators of the selection valve 21 will ensure that the valve 21 will shift position to one side, so that the solely the pressurized liquid from the control circuit 20a, 20b in full function will be fed to the pilot pressure line 19 and the wind turbine 1 will continue the ordinary operation without being affected by the malfunction of a valve 24a, 24b, 25a, 25b.

In case of a malfunction of one of the control circuits 20a, 20b, the high control pressure from the control circuit 20a, 20b in full function will be connected to the low control pressure from the malfunctioning control circuit 20a, 20b in the selection valve 21 where the two are mixed. This could eventually create equal pressure in the control pressure lines 26a, 26b and prevent the selector valve 21 from shifting position correctly. For that reason, the orifices 22a, 22b are provided between the control pressure lines 26a, 26b and the connection of the control circuits 20a, 20b to the selector valve 21, so that a flow of pressurized fluid from the control circuit 20a, 20b in full function through the selector valve 21 and into the malfunctioning control circuit 20a, 20b will pass an orifice 22a, 22b before entering the corresponding control pressure line 26a, 26b, and thus encounter a pressure drop sufficient to ensure a pressure difference between the hydraulic actuators of the selector valve 21 that will cause the selector valve 21 to shift position correctly.

FIG. 6 is a diagram of main components of a hydraulic blade pitch system for a single blade 5 of a wind turbine 1 according to an embodiment of the present invention. The system comprises a linear hydraulic actuator 15 with a piston 27 arranged displaceable within a cylinder 28 which is divided by the piston 27 into a piston rod chamber 29 or front chamber (the internal chamber comprising the piston rod 30) of the cylinder 28 and a bottom chamber 31 or rear chamber (the internal chamber which does not comprise the piston rod 30). The piston rod 30 is connected (not shown) to the hub 7 of the wind turbine rotor 4 and the cylinder 28 is connected (not shown) to the blade 5 so as to effect an angular displacement of the blade 5 when liquid under pressure is applied to the piston rod chamber 29 or to the bottom chamber 31.

The flow of pressurised liquid from the hydraulic pump 32 to the linear hydraulic actuator 15 is controlled by means of a proportional hydraulic valve 34. The hydraulic pump 32 may be arranged for the entire system for providing pressurised liquid to the hydraulic blade pitch systems for each of the blades 5 or pumps may be arranged separately for each blade as shown in FIG. 6 as well as for the central system.

The proportional hydraulic valve 34 has a pressure port P connected via the pressure line 17 to the hydraulic pump 32 and a tank port T connected via the tank line 18 to the low pressure tank 33. One actuator port A of the valve 34 connects to the bottom chamber 31 of the hydraulic linear actuator 15, whereas the other actuator port B is connected to the piston rod chamber 29 of the hydraulic linear actuator 15.

The proportional hydraulic valve 34 is biased by springs towards a neutral centre position in which the ports are closed and no liquid flows through the valve. The proportional hydraulic valve 34 may be shifted in one direction by means of solenoids or a separately controlled pressurised pilot liquid so that the pressure port P is gradually opened towards the first actuator port A and the tank port T is gradually opened towards the second actuator port B, or the valve 34 may be shifted in the opposite direction causing the pressure port P to be gradually opened towards the second actuator port B and the tank port T to be gradually opened towards the first actuator port A. Thus, the operation of the proportional hydraulic valve 34 may be used to selectively move the piston 27 in one or the other direction so as to pitch the blade with a controlled and variable pitch speed in one direction or the other.

In case an emergency feathering operation is initiated from the pilot circuitry 16 by lowering of the pilot pressure in the pilot pressure line 19, pressurized hydraulic liquid from a hydraulic accumulator 35, which during ordinary operation of the wind turbine 1 is charged with pressurized liquid from the pressure line 17, is fed to the hydraulic linear actuator 15 in order to drive the feathering of the blade 5 regardless of a possible lack of pressure in the pressure line 17 as the pump 32 may be out of operation. The lowering of the pilot pressure in the pilot pressure line 19 will close the accumulator valve 36 and only allow liquid to leave the accumulator 35 through the accumulator check valve 37. The emergency supply check valve 38 is, under normal operation, closed by means of the pilot pressure and is, during the emergency feathering operation, opened for liquid flow from the accumulator 35 to the bottom chamber 31 of the cylinder 28. Likewise will the emergency drain check valve 39 be opened for allowing the hydraulic liquid in the piston rod chamber 29 of the cylinder 28 to drain directly to the tank 33, bypassing the proportional hydraulic valve 34. Thus, the pressurized liquid in the hydraulic accumulator 35 will change the position of the piston 27 and, through the piston rod 30, turn the blade 5 towards the feathered position.

It is evident to the skilled person that the system shown in FIG. 6 is schematically shown and that a number of variations to the system would be possible. For example, the system may include a flow controller or means to control the flow rate of the liquid from the accumulator 35 to the bottom chamber 31 of the cylinder 28 in order to control the angular speed of the feathering of the blade.

Figure 7:
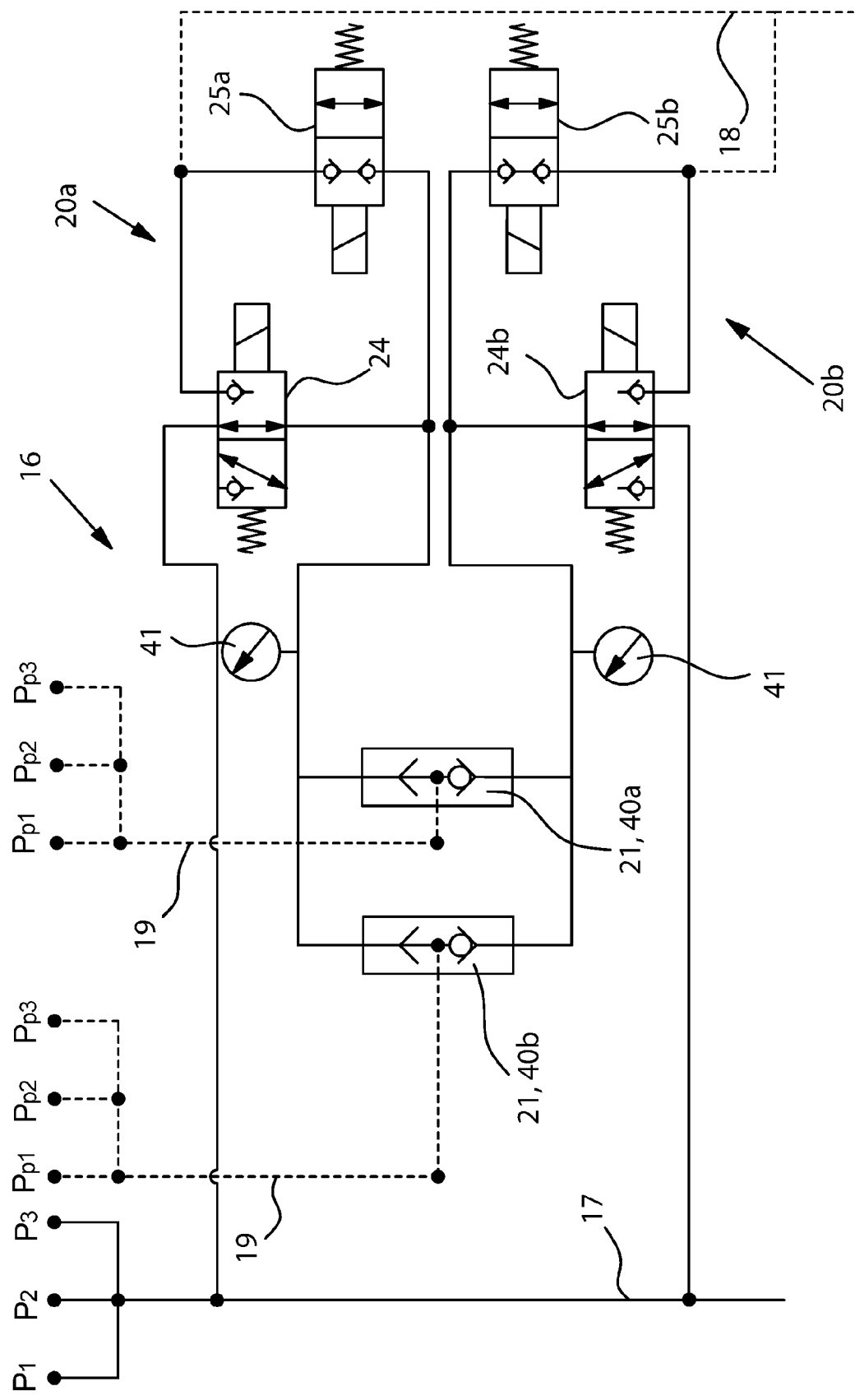
FIG. 7 is a diagram of an alternative embodiment of a pilot circuitry.

The pilot circuitry 16 shown in FIG. 7 differs from the system shown in FIGS. 4 and 5 in that the 4/3-way directional control valve and the two flow control arrangements comprising orifices 22a, 22b and check valves 23a, 23b have all been replaced by two shuttle valves 40a, 40b each acting as a selector 21.

In this embodiment, the a first control circuit 20a and the second control circuit 20b are both connected to the first shuttle valves 40a and the second shuttle valves 40b that are coupled in parallel. The system comprises two shuttle valves 40a, 40b for redundancy, but in another embodiment, the system could comprise only one shuttle valve, it could comprise three shuttle valves or even more shuttle valves.

To further increase the reliability of the hydraulic system, each of the two shuttle valves 40a, 40b is connected to its own separate pilot pressure line 19. In another embodiment, however, the shuttle valves 40a, 40b could be connected to the same pilot pressure line 19.

To even further increase the reliability of the hydraulic system, each of the two control circuits 20a, 20b is provided with a pressure gauge 41 to monitor the condition of each control circuit 20a, 20b so that if the pressure in one of the circuits 20a, 20b deviates to much from the expected pressure, it is likely that a fault has occurred. But, because of the redundancy of the system, the wind turbine can safely continue operation with the remaining control circuit 20a, 20b until the problem causing the unexpected pressure reading can be fixed.

LIST OF REFERENCE NUMBERS AND SYMBOLS

1. Wind turbine
2. Tower
3. Nacelle
4. Rotor
5. Blade
6. Hydraulic blade pitch system
7. Hub
8. Hydraulic blade pitch drive
9. Pitch bearing
10. Gearbox
11. Brake
12. Generator
13. Converter
14. Nacelle structure
15. Linear hydraulic actuator for first blade
16. Pilot circuitry
17. Pressure line
18. Tank line
19. Pilot pressure line
20a. First control circuit
20b. Second control circuit
21. Selector valve
22a. Orifice of a first flow control arrangement
22b. Orifice of a second flow control arrangement
23a. Check valve of a first flow control arrangement
23b. Check valve of a second flow control arrangement
24a. 3/2-way valve of the first control circuit
24b. 3/2-way valve of the second control circuit
25a. 2/2-way valve of the first control circuit
25b. 2/2-way valve of the second control circuit
26a. Control pressure line
26b. Control pressure line
27. Piston
28. Cylinder
29. Piston rod chamber
30. Piston rod
31. Bottom chamber
32. Hydraulic pump
33. Tank
34. 4/3-way proportional hydraulic valve
35. Hydraulic accumulator
36. Accumulator valve
37. Accumulator check valve
38. Emergency supply check valve
39. Emergency drain check valve
40a. First shuttle valve
40b. Second shuttle valve
41. Pressure gauge
T Tank port of the proportional hydraulic valve
P Pressure port of the proportional hydraulic valve A First actuator port of the proportional hydraulic valve
B Second actuator port of the proportional hydraulic valve
$P_1$ Pressure line connection to the pitch system of the first blade
$P_2$ Pressure line connection to the pitch system of the second blade
$P_3$ Pressure line connection to the pitch system of the third blade
$P_{p1}$ Pilot pressure line connection to the pitch system of the first blade
$P_{p2}$ Pilot pressure line connection to the pitch system of the second blade
$P_{p3}$ Pilot pressure line connection to the pitch system of the third blade

The invention claimed is:

1. A pilot circuitry for controlling the activation of an emergency feathering system of a wind turbine by using a pilot pressure, the pilot circuitry comprising:
a first control circuit for providing a pilot pressure; and
a second control circuit for providing a pilot pressure, wherein the first and second control circuits are in parallel with each other; and
a selector operatively coupled to the first and second control circuits and to the emergency feathering system, wherein the selector prevents the first control circuit from providing the pilot pressure to the emergency feathering system in case of malfunction of the first control circuit, and the selector prevents the second control circuit from providing the pilot pressure to the emergency feathering system in case of malfunction of the second control circuit.

2. The pilot circuitry according to claim 1, wherein the selector is configured to perform a comparison of the pilot pressure of the first and second control circuits, and to disable the one of the first or second control circuits that provides a pilot pressure for activating the emergency feathering system while the other of the first or second control circuits provides a pilot pressure for not activating the emergency feathering system.

3. The pilot circuitry according to claim 1, wherein each of the first and second control circuits comprises at least two valves and is configured so that a malfunction of one valve of one of the first or second control circuits will cause the one of the first or second control circuits to provide a pilot pressure for activating the emergency feathering system.

4. The pilot circuitry according to claim 1, wherein the pilot pressure for activating the emergency feathering system is lower than the pilot pressure for not activating the emergency feathering system.

5. The pilot circuitry according to claim 1, wherein the selector comprises a selector valve equipped with at least one hydraulic actuator driven by the pilot pressures provided by the first and second control circuits.

6. The pilot circuitry according to claim 1, wherein the selector comprises one or more shuttle valves.

7. The pilot circuitry according to claim 1, wherein the selector comprises two or more shuttle valves and wherein the two or more shuttle valves are coupled in parallel.

8. A wind turbine, comprising:
a rotor with at least two blades; and
a blade pitch system for controlling the pitch angle of the blades, the blade pitch system comprising:
at least one hydraulic actuator;
an emergency feathering system for a case of an emergency stop to turn the blades to a feathering position using the at least one hydraulic actuator; and
a pilot circuitry comprising a first control circuit for providing a pilot pressure, a second control circuit for providing a pilot pressure, wherein the first and second control circuits are in parallel with each other, and a selector operatively coupled to the first and second control circuits and to the emergency feathering system, wherein the selector prevents the first control circuit from providing the pilot pressure to the emergency feathering system in case of malfunction of the first control circuit, and the selector prevents the second control circuit from providing the pilot pressure to the emergency feathering system in case of malfunction of the second control circuit.

9. The wind turbine according to claim 8, further comprising for each blade a hydraulic blade pitch drive with at least one hydraulic actuator, wherein the emergency feathering system further comprises a hydraulic accumulator configured to provide a pressurized hydraulic liquid for driving the at least one hydraulic actuator to pitch the blade to an emergency feathering position.

10. The pilot circuitry according to claim 1, wherein the first and second control circuits are provided a pilot pressure from a common source.

11. The wind turbine according to claim 8, wherein the first and second control circuits are provided a pilot pressure from a common source.

* * * * *